Jan. 8, 1957     J. B. TAULE     2,776,614
ATTACHMENT FOR AGRICULTURAL MACHINE
Filed March 26, 1954
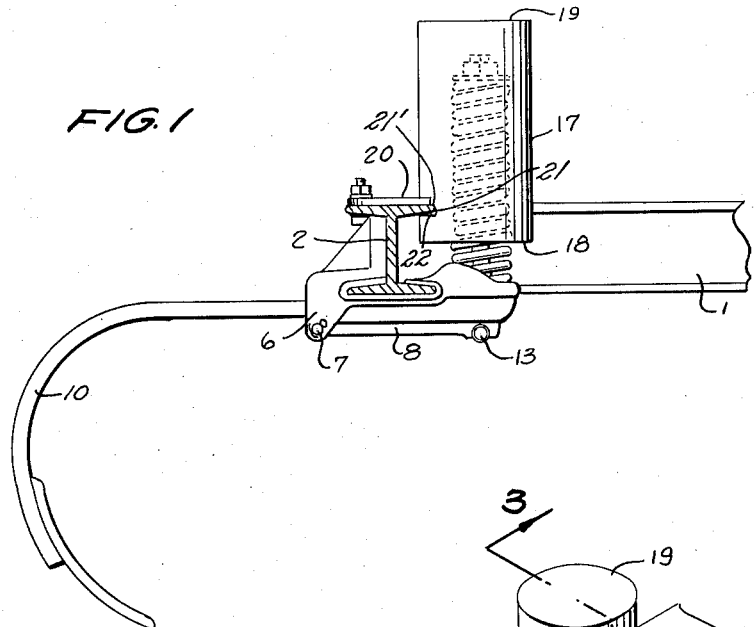
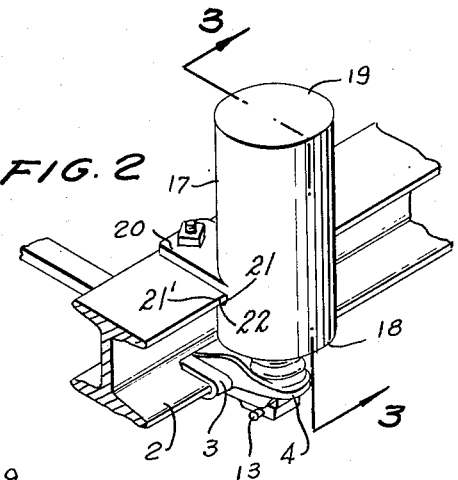
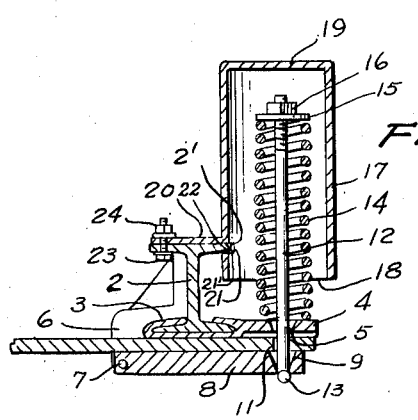
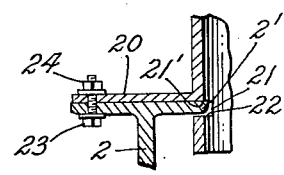
INVENTOR.
JOSEPH B. TAULE
BY
McMorrow, Berman & Davidson
ATTORNEYS

United States Patent Office 2,776,614
Patented Jan. 8, 1957

2,776,614

ATTACHMENT FOR AGRICULTURAL MACHINE

Joseph B. Taule, Sweet Grass, Mont.

Application March 26, 1954, Serial No. 419,001

3 Claims. (Cl. 97—47.84)

This invention relates to agricultural machines, and more specifically, to an attachment for ground cultivating devices. The invention pertains to an attachment for gang plows and has been especially assigned for use in conjunction with a Graham type plow.

As is well known to those experienced in this art, most gang plows are connected to a plow beam with the plow end adjacent to the beam spring biased to permit the working end of the plow to move vertically when it encounters a rock or hard soil. Under such circumstances, the spring may break and pieces thereof be hurled, at high speed and with great force, very great distances. This is an ever present danger to the plow operator and it is to the elimination of this peril of physical injury which may result in death that the present invention is addressed.

Thus, one of the primary objects of this invention is to provide an armor guard for the spring of a plow of the type referred to above.

Another object of this invention is to provide means for confining pieces of a plow biasing spring within a casing to prevent the dispersion thereof upon its fracture under the force of compression.

A still further object of this invention is to provide a spring guard or casing for the biased ends of plows which are non-complex in construction and application, and which is inexpensive to manufacture and maintain.

Other and further objects and advantages of this invention will become more apparent from a consideration of the following specification when read in the light of the annexed drawing, in which:

Figure 1 is a side elevation of a spring guard constructed in accordance with the teachings of this invention and installed over the biasing spring of a Graham type plow;

Figure 2 is a perspective view of the guard illustrated in Figure 1; and

Figure 3 is a cross-sectional view taken on the vertical plane of line 33 in Figure 2.

Figure 4 is an enlarged sectional view of a portion on the same section line as Figure 3.

Referring now more specifically to the drawing, reference numeral 1 designates one of a pair of spaced, parallel and elongated side frame members of a gang plow of conventional construction. As is customary in farm machinery of this type, the side members are connected adjacent their respective ends by a cross-beam 2 and carries a plurality of brackets 3 thereon which are movable longitudinally thereof to adjusted positions. The brackets 3 are formed with a fixed lip 4 which extends forwardly and is provided with a central aperture 5. The brackets 3 are also constructed with a pair of spaced depending side walls 6 between which is mounted a pivot pin 7 positioned below the bracket 3. One end of a lever 8 is pivotally mounted on the pin 7, while the other end thereof extends forwardly below the lip 4 and is provided with a marginally positioned aperture 9 vertically aligned with the aperture 5.

As seen in Figure 3, one end of a plow blade 10 is inserted between the bracket 3, lip 4 and the lever 8, and is apertured at 11, the latter being in registry with apertures 5 and 9.

A vertical standard 12 is passed through the aligned apertures and projects above the lip 4. As seen in the figures, the lower end of the standard 12 is bent at substantially right angles to form a lateral extension 13 which supports the lever 8 in its normal, substantially horizontal position.

A helicoidal spring 14 is passed over the standard 12 with one end thereof abutting the lip 4, while the other end engages against a collar 15 mounted on the other threaded end of the standard 12 and is prevented from vertical movement by the lock nut 16.

All of the above described elements and associated parts are conventional in this art, and it is to be understood form no part of the present invention.

The subject matter of this invention is a spring guard which comprises an elongated substantially hollow metallic cylinder 17 having opposed open and closed ends, 18 and 19, respectively. An integrally formed substantially rectangular flange 20 projects laterally from the casing 17 substantially parallel to the opposed open and closed ends 18, 19. A horizontal slot 21 is cut into the casing 20 below and immediately adjacent the flange 20.

In assembly, the casing 17 is set over the spring 14 with the flange 20 abutting against the upper end of the cross-beam 2, and the leading edge 2' of the latter is positioned within the slot 21. A stud bolt 23 and nuts 24 serve to secure the casing 17 to the cross-beam 2.

Thus, it will be apparent that the guard for the spring 14 is formed by the hollow casing wherein the horizontal slot or notch 21 is provided therein extending through one side thereof adjacent the open end to define a guide for receiving the upper flange of the cross beam 2 therein so as to position the casing or cylinder 17 relative to the cross beam with the flange 20 defining an anchoring tongue extending outwardly from the casing at the top wall 21' of the notch 21 to overlie the upper flanges of the cross beam, while the bottom wall 22 of the notch defines a locking projection cooperating with the bolt 23 and nut 24 to secure the casing in its position relative to the cross beam since this locking projection will engage the lower surface of the outwardly projecting flange of the cross beam received within the notch.

It should now be manifest that should the spring 14 fatigue and fracture under the constant compression and expansion forces exerted thereon through the pivotal movement of the plow blade 10, the pieces of the spring will strike against and are arrested by the casing 17.

Having described and illustrated in detail one embodiment of this invention, it will be understood that the same is offered by way of example, and that the invention is to be only limited by the scope of the appended claims.

What is claimed is:

1. A guard for springs comprising a hollow casing having opposed open and closed ends, said casing having a notch extending through one side thereof and an anchoring tongue carried by said casing and extending outwardly therefrom adjacent the top wall of said notch.

2. In a plow of the type including a frame having spaced side members and a cross beam provided with outwardly extending flanges projecting from opposite upper and lower longitudinal edges thereof extending between the frame members, and spaced plow blades carried adjacent one of their ends by the cross beam, a spring carried by each of said blades adjacent said one end thereof to impart a resilient bias thereto; a guard for said spring comprising a hollow casing having opposed open and closed ends surrounding said spring, said casing having a notch therein extending through one side thereof adjacent said open end to define a guide receiving the upper flange of said cross beam therein to position said casing relative to the cross beam, an anchoring tongue carried by said casing and extending outwardly therefrom at the top wall of said notch to overlie said cross beam, and means for securing said tongue on said beam to maintain said guard in its surrounding relation to said spring.

3. In a plow of the type including a frame having spaced side members and a cross beam provided with outwardly extending flanges projecting from opposite upper and lower longitudinal edges thereof extending between the frame members, and spaced plow blades carried adjacent one of their ends by the cross beam, a spring carried by each of said blades adjacent said one end thereof to impart a resilent bias thereto; a guard for said spring comprising a hollow casing having opposed open and closed ends surrounding said spring, said casing having a notch therein extending through one side thereof adjacent said open end to define a guide receiving the upper flange of said cross beam therein to position said casing relative to the cross beam, an anchoring tongue carried by said casing and extending outwardly therefrom at the top wall of said notch to overlie said cross beam, and means for securing said tongue on said beam to maintain said guard in its surrounding relation to said spring, the bottom wall of said notch defining a locking projection cooperating with said means to secure said casing on the cross beam.

References Cited in the file of this patent

UNITED STATES PATENTS

| | | |
|---|---|---|
| 1,051,836 | Gast | Jan. 28, 1913 |
| 1,117,263 | Shute | Nov. 17, 1914 |
| 1,313,802 | Dunlap | Aug. 19, 1919 |
| 1,970,823 | Suczek | Aug. 21, 1934 |
| 2,493,811 | Graham | Jan. 10, 1950 |

FOREIGN PATENTS

| | | |
|---|---|---|
| 822,737 | Germany | Feb. 11, 1952 |